United States Patent [19]

MacArthur et al.

[11] Patent Number: 5,525,804
[45] Date of Patent: Jun. 11, 1996

[54] BACKGROUND CANCELING SURFACE ALPHA DETECTOR

[75] Inventors: Duncan W. MacArthur, Los Alamos; Krag S. Allander, Ojo Caliente; John A. Bounds, Los Alamos, all of N.M.

[73] Assignee: The Regents of the University of California, Oakland, Calif.

[21] Appl. No.: 382,333

[22] Filed: Feb. 1, 1995

[51] Int. Cl.[6] .................................................. G01T 1/02
[52] U.S. Cl. .................. 250/374; 250/380; 250/385.1
[58] Field of Search ...................................... 250/374, 379, 250/380, 385.1, 382, 384

[56] References Cited

U.S. PATENT DOCUMENTS

| | | | |
|---|---|---|---|
| 3,621,238 | 11/1971 | Jalbert et al. | 250/380 X |
| 5,194,737 | 3/1993 | MacArthur et al. | 250/379 X |
| 5,311,025 | 5/1994 | MacArthur et al. | 250/574 |
| 5,324,948 | 6/1994 | Dudar et al. | 250/379 |

Primary Examiner—Carolyn E. Fields
Assistant Examiner—Edward J. Glick
Attorney, Agent, or Firm—Milton D. Wyrick; William A. Eklund

[57] ABSTRACT

A background canceling long range alpha detector which is capable of providing output proportional to both the alpha radiation emitted from a surface and to radioactive gas emanating from the surface. The detector operates by using an electrical field between first and second signal planes, an enclosure and the surface or substance to be monitored for alpha radiation. The first and second signal planes are maintained at the same voltage with respect to the electrically conductive enclosure, reducing leakage currents. In the presence of alpha radiation and radioactive gas decay, the signal from the first signal plane is proportional to both the surface alpha radiation and to the airborne radioactive gas, while the signal from the second signal plane is proportional only to the airborne radioactive gas. The difference between these two signals is proportional to the surface alpha radiation alone.

18 Claims, 4 Drawing Sheets

BACKGROUND CANCELING SURFACE ALPHA DETECTOR

The present invention generally relates to the monitoring for alpha particle contamination and, more specifically, to the monitoring of surface alpha contamination while canceling background radiation. This invention was made with Government support under Contract No. W-7405-ENG-36 awarded by the U.S. Department of Energy. The Government has certain rights in the invention.

BACKGROUND OF THE INVENTION

In any area where radioactive materials are handled, it is imperative, both for the protection of personnel and to avoid contamination of the environment, to continuously monitor personnel, surfaces, equipment, and clothing to prevent the release of radioactive contamination. Alpha contaminants, such as plutonium and uranium, are particularly difficult to detect because plutonium primarily emits alpha radiation, and alpha radiation has very limited penetration in air. Alpha particles from typical contaminants travel no more than one inch in air. It is because of this characteristic that prior alpha detectors have been useful only when used in close proximity to the point of possible radioactive emission.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Also, these conventional alpha particle detectors can only scan an area approximately equal to the size of the detector.

Prior to the development of the long range alpha detector technology, alpha contamination, because of its short range in air, could not be detected if it originated in a space that was too small for insertion of a conventional monitor. Conventional detectors have normally been employed in personnel screening, when moved slowly in close proximity to a person's body. Workers in nuclear processing facilities must place their hands and feet on sensors when moving from room to room. All of this can slow operations, as it is not currently possible to adequately screen personnel within a reasonably short period of time.

It is also extremely difficult to monitor equipment and surfaces for alpha contamination, again due to the limited range of alpha particles in air. Because of the monitoring difficulty, equipment that has been used in a potentially contaminated area is often classified as potentially contaminated, and its further use is restricted to other controlled areas, or even discarded prior to the end of its useful life. If such equipment could be effectively monitored for contamination, the equipment could be released for use in uncontrolled areas. Previously, contamination inside assemblies has been impossible to detect without dismantling the assembly.

Additionally, within plutonium processing facilities and in many decontamination projects, potential alpha emitting contamination on the floor is a serious problem. Loose material is easily tracked from room to room, causing the contamination to spread. The conventional method of monitoring for this contamination was to employ floor monitors consisting of a portable alpha monitor with a very large detector head that would slowly scan over the floor.

These detectors suffered from numerous problems, among them being intrinsically poor sensitivity, degradation over time because of use by unskilled individuals, and workers moving the detector too rapidly over the surface. All of these problems are addressed by the present invention, which provides a sensitive, accurate and versatile alpha detector.

The present invention allows contamination detection from surfaces while at the same time canceling the effect of natural radioactive gases emanating from the soil surface as well as limiting the sensitivity of the measurement to external gamma ray sources.

As used herein, the terms "long range," or "long distance," when referring to the detection capabilities of the present invention, shall mean detection from a range or distance of more than one (1) inch from the source of alpha radiation.

The primary reason for an alpha particle's short flight path in air is its collision with air molecules. In almost all of these collisions, various of the molecular species in air are ionized. These ions, referred to herein as "air ions," have a sufficiently long lifetime that they may be transported by mass flow of the surrounding air, or by the direct attraction of an electric field, and detected at distances much greater than the penetration distances of the original alpha particles. That is, the air ions thus created have a longer life and area of influence than the alpha particles that created them. These are the ions that are detected by the present invention. The fact that the air ions have a longer range than the alpha particles relieves the necessity for having a detector moved in close proximity over a person or equipment in order to detect the presence of alpha radiation.

The present invention provides an alpha monitor with background cancellation. It is based on technology which is contained in several U.S. Patents which disclose various devices for the long range detection of alpha particles. The first is U.S. Pat. No. 5,184,019, issued Feb. 2, 1993, for a Long Range Alpha Particle Detector. The second is U.S. Pat. No. 5,194,737, issued Mar. 16, 1993, for Single and Double Grid Long Range Alpha Detectors. The third is U.S. Pat. No. 5,187,370, issued Feb. 16, 1993, for Alternating Current Long Range Alpha Particle Detectors. The fourth is U.S. Pat. No. 5,281,824, issued Jan. 25, 1994, for Radioactive Detection. The fifth is U.S. Pat. No. 5,311,025, issued May 10, 1994, for Fan-less Long Range Alpha Detector. Another recently filed application bears Ser. No. 08/833,020, filed Nov. 1, 1994, entitled "Event Counting Alpha Detector." As previously described, the principle underlying each of these patents and patent application is that alpha particles, although themselves of very short range in air, ionize various of the molecular species in air. The present invention modifies this apparatus to provide for reliable detection of alpha radiation from surfaces from which radioactive might be emitted. The invention employs background cancellation through the electrostatic detection of air ions created both by alpha contamination and by background radiation.

The fact that long range alpha detectors, as described in the above-referenced patents and application, can detect alpha radiation at a considerable distance from its point of emanation allows for monitoring of contamination in several areas which are extremely difficult or even impossible for current detectors. The current invention accomplishes this through the use of dual detection chambers, allowing emissions from the decay of radioactive gas and any daughters to be detected separately from emissions resulting from surface contamination.

It is therefore an object of the present invention to provide apparatus for the long range detection of alpha radiation emitted from a surface.

It is another object of the present invention to provide apparatus for the detection of alpha radiation emitted from a surface while at the same time canceling any background radiation originating from radioactive gas and any daughters or from strong external gamma radiation sources.

It is yet another object of the present invention to provide apparatus for the detection of alpha radiation emanating from a surface which can provide separate outputs indicative of the levels both of surface contamination and of radioactive emission.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided an alpha radiation detector for measuring alpha radiation emitted from a surface comprising an electrically conductive enclosure defining a cavity, the enclosure having an opening at one end for positioning against a contaminated surface. First signal plane means is insulatively mounted in the cavity of the electrically conductive enclosure and spaced inwardly from the opening to define a first chamber within the cavity, the first chamber being between the first signal plane means and the opening, the first signal plane means being sized and positioned to substantially span the cavity so that air ions generated in the first chamber are electrostatically captured by the first signal plane means and the electrically conductive enclosure when an electric potential is applied between the enclosure and the first signal plane means, and said first signal plane means being configured to allow free circulation of air through the cavity and past the first signal plane. Second signal plane means is insulatively mounted in the cavity inward and spaced apart from the first signal plane means, to define a second chamber within the cavity, the second chamber being between the second signal plane means and the enclosure inward from the second signal plane, the second signal plane means being also sized and positioned to substantially span the cavity so that air ions generated in the second chamber are electrostatically captured by the second signal plane means and the electrically conductive enclosure when an electrical potential is applied between the enclosure and the second signal plane means, and said second signal plane means also being configured to allow free circulation of air through the cavity and past the second signal plane means. First indicator means is attached to the first signal plane means for indicating a first electrical current produced by collection of air ions generated in the first chamber by alpha particles emitted from said contaminated surface and by decay of radioactive gas emanated from the contaminated surface. Second indicator means is attached to the second signal plane means for indicating a second electrical current produced by collection of air ions generated in the second chamber by decay of radioactive gas emanated from the contaminated surface. A voltage source is connected between the first and second indicator means and the electrically conductive enclosure. A difference between the first and second electrical currents represents a measure of the alpha particles emitted from the contaminated surface, free of any background signal produced by decaying radioactive gas emanated from the contaminated surface.

In another aspect of the present invention there is provided a background canceling alpha detector for measuring alpha radiation emitted from a surface comprising an electrically conductive enclosure defining a cavity, the electrically conductive enclosure having an opening at one end for positioning against a contaminated surface. First signal plane means is insulatively mounted in the cavity of the electrically conductive enclosure and spaced inwardly of the opening to define a first chamber within the cavity, the first chamber being between the first signal plane means and the opening, the first signal plane means being sized and positioned to substantially span the cavity so that air ions generated in the first chamber are electrostatically captured by the first signal plane means and the electrically conductive enclosure when an electric potential is applied between the enclosure and the first signal plane means, and said first signal plane means being configured to allow free circulation of air through the cavity and past the first signal plane. Second signal plane means is insulatively mounted in the cavity on the opposite side of the first signal plane means inward from the opening, to define a second chamber within the cavity, the second chamber being between the second signal plane means and the enclosure inward of the second signal plane, the second signal plane means also being sized and positioned to substantially span the cavity so that air ions generated in the second chamber are electrostatically captured by the second signal plane means and the electrically conductive enclosure when an electrical potential is applied between the enclosure and the second signal plane means, and said second signal plane means also being configured to allow free circulation of air through the cavity and past the second signal plane means. Guard plane means is insulatively mounted in the cavity between the first signal plane means and the second signal plane means for reducing leakage currents. First indicator means is attached to the first signal plane means for indicating a current produced by collection of air ions generated in the first chamber both by alpha particles emitted from the contaminated surface and by decay of radioactive gas atoms emanated from the contaminated surface. Second indicator means is attached to the second signal plane for indicating a second electrical current generated in the second chamber by decay of the radioactive gas emanated from the contaminated surface. A voltage source is connected between the first and second indicator means and the guard plane means, and the electrically conductive enclosure. A difference between the first and second electrical currents represents a measure of the alpha particles emitted from the contaminated surface, free of background signal caused by decay of radioactive gas emanated from the contaminated surface.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention provides apparatus for the detection of alpha particles emanating from a surface such as a soil surface while simultaneously canceling the background radiation produced by radioactive emanating from the surface. The invention may be best understood by reference to the figures, where schematical illustrations of detector 10 are shown.

Figure 1:
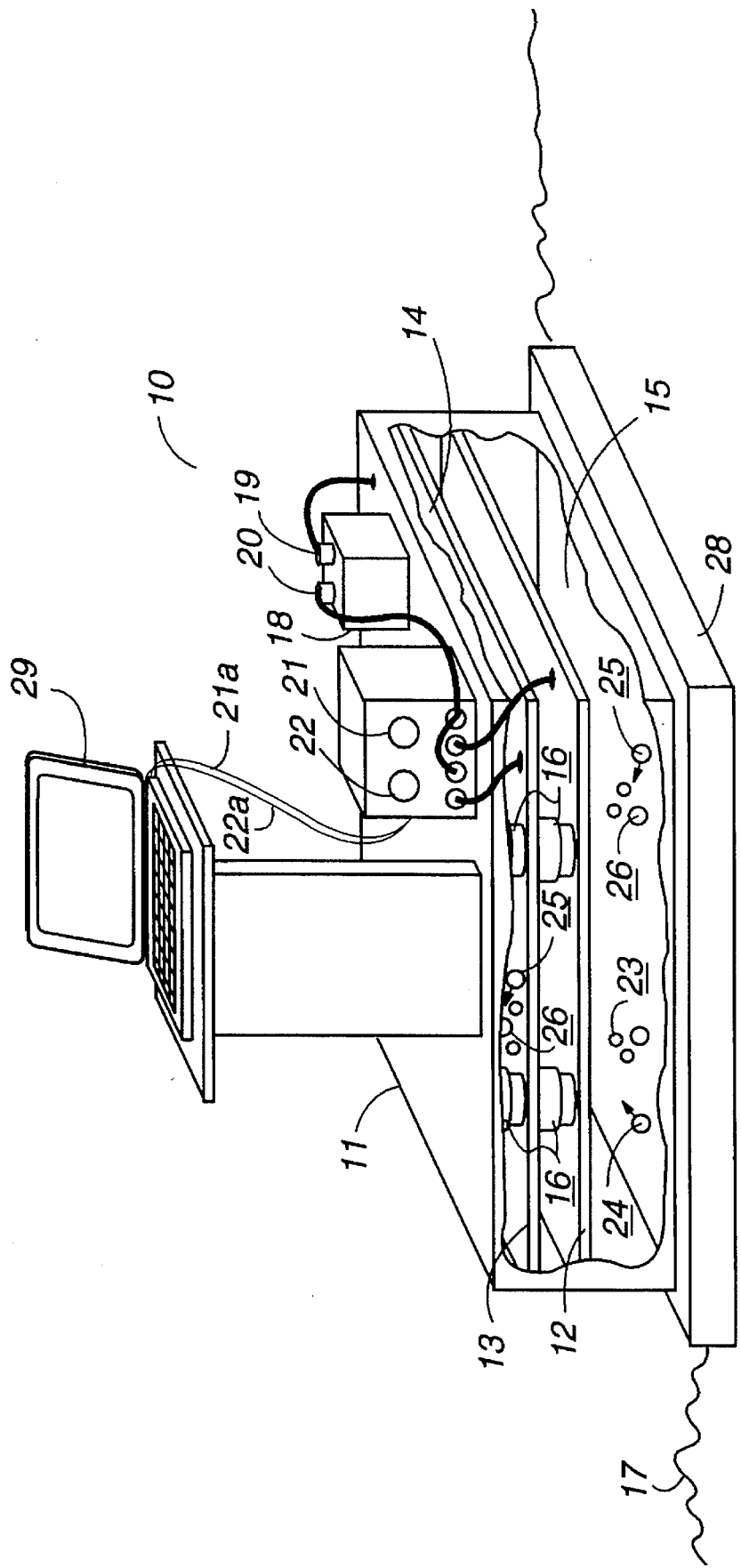
FIG. 1 is a cutaway perspective drawing of one embodiment of the present invention in which there are first and second signal planes and only convection movement of air through the detector.

As shown in FIG. 1, detector 10 comprises electrically conductive enclosure 11, which encloses first signal plane 12 and second signal plane 13 which define an upper chamber 14, and a lower chamber 15. Electrically conductive enclosure 11 is a metallic enclosure defining a cavity and having an opening at one end. First signal plane 12 and second signal plane 13 are substantially parallel to contaminated surface 17 and to each other, and are mounted to enclosure 11 and to each other using insulative stand-offs 16, which may be made of either LEXAN® (polycarbonate resins) or TEFLON® (polytetrafluoroethylene)

In other embodiments (not shown) insulative stand-offs 16 could support first signal plane 12 and second signal plane 13 laterally. That is, insulative stand-offs would extend from the edges of first signal plane 12 and second signal plane 13 to the inside walls of electrically conductive enclosure 11. This mounting method could be applied to any of the embodiments of the present invention.

Electrically conductive enclosure 11 may be constructed of any desired electrically conductive material, such as aluminum, and in most any desired shape. As stated, enclosure 11 is open bottomed, and in contact with contaminated surface 17. Surface 17 represents, in addition to soil, any other solids, or liquids, any of which may be contaminated. All of these may easily be monitored with this embodiment of the present invention without the possible spread of radiation into the environment, since a fan is not used to draw air through the detector.

As shown, electrically conductive enclosure 11 is in contact with and grounded to the surface 17 to be monitored. Voltage source 18 has its negative post 19 connected to electrically conductive enclosure 11 which is in contact with surface 17 which is to be monitored, and its positive post 20 connected through electrometer 21 to first signal plane 12, and through electrometer 22 to second signal plane 13. If desired, outputs 21a and 22a of electrometers 21, 22 may be connected to computer 29 for storage and display.

If desired for a particular application where surface 17 is not substantially flat, air seal 28 may be applied around the periphery of electrically conductive 11 as shown to prevent the entry of foreign matter into detector 10. Air seal 28 may be comprised of foam rubber, and is applied to electrically conductive 11 so that, when not compressed, it extends below electrically conductive 11. When applied to a solid surface 17, the weight of detector 10 will compress air seal 28, forming an effective air seal about detector 10. Although the dimensions of air seal 28 are not critical, so long as it is effective to seal electrically conductive enclosure 11, dimensions of 2 inches deep by 4 inches wide have proven to be effective.

Voltage source 18 need supply typically 300 V or less for proper operation of detector 10. When detector 10 is used in field operations, it will be most convenient if voltage source 18 is a battery. In many other applications, use of a battery or other direct current source will be preferred. However, an alternating current source could also be used. In this event, air ions of both polarities will be detected by first signal plane 12, and by second signal plane As connected in the present invention, first signal plane 12 and second signal plane 13 are at the same potential, preventing leakage current between them and through electrometers 21, 22. There is a relatively large leakage current between first signal plane 12 or second signal plane 13, and electrically conductive enclosure 11, but this current does not flow through electrometers 21, 22.

First signal plane 12 and second signal plane 13 are electrically conductive and are sized to create upper chamber 14 and lower chamber 15, while still allowing free air circulation between them and electrically conductive enclosure 12. First signal plane 12 and second signal plane 13 may be either solid or perforated, or they may comprise a planar conductive mesh. The important point is that air must be able to freely circulate either around or through first and second signal planes 12, 13, while first and second signal planes 12, 13 must be configured to capture substantially all of the air ions created in lower chamber 14 and upper chamber 15. Aluminum or copper may conveniently be used. However, other electrically conductive materials can also be employed.

In this embodiment, the present invention does not employ a forced flow of air in order to detect contamination from contaminated surface 17 . Natural convection currents and diffusion will allow movement of air ions 23 created by alpha particles 24 to be attracted toward and collected by first signal plane 12, and will allow radioactive gas atoms 25 to exist both in lower chamber 15 and in upper chamber 14. Because of this, first signal plane 12 will produce a signal in electrometer 21 which is proportional to air ions 23 from surface 17 contamination and those created through the disintegrations of radioactive gas atoms 25 emanating from below surface 17 and residing in lower chamber 15, and creating air ions 26. Second signal plane 13, however, will produce a signal in electrometer 22 which is proportional only to the decays of radioactive gas atoms 25 which have migrated into upper chamber 14.

If upper chamber 14 and lower chamber 15 are of equal volumes, the signals from first and second signal planes 12, 13 can be directly subtracted. However, should, through construction choices, the volumes of upper chamber 14 and lower chamber 15 be dissimilar, one of the signals from either first signal plane 12 or second signal plane 13 would be scaled by the ratio of the volumes of upper chamber 14 and lower chamber 15 prior to subtraction.

Radioactive gas atoms 25 may be any of the radioactive gases which might exist in the soil, liquids, or other surfaces. Examples of such radioactive gases are radon and tritium.

In operation, detector 10 is placed over the area of surface 17 to be monitored for alpha radiation. Using the direct current voltage source 18, air ions 23 created by collisions with the short range alpha particles 24 emitted from surface 17 are attracted to first signal plane 12, and to the walls of enclosure 11, depending on their charge, because of the electric field established between first signal plane 12 and electrically conductive enclosure 11 and surface 17. Radioactive gas atoms 25, which will be in both lower chamber 15 and upper chamber 14, will undergo disintegration, and produce air ions 26. Air ions 26 will be collected by first signal plane 12 and second signal plane 13. Readings from electrometers 21, 22 may be taken after the passage of time sufficient for the attainment of equivalent concentrations of radioactive gas atoms 25 in upper chamber 14 and lower chamber 15, as indicated by relatively steady readings from electrometers 21, 22.

Figure 2:
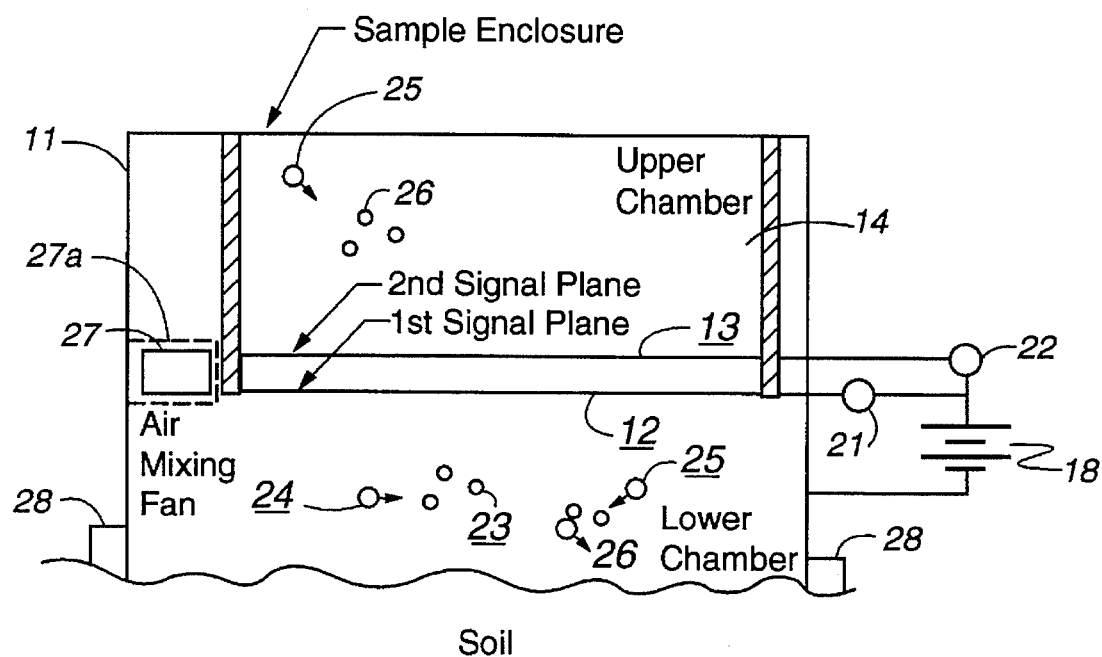
FIG. 2 is a schematical drawing of another embodiment of the present invention showing the use of a single fan to move air through the detector.

FIG. 2 illustrates an embodiment in which an air mixing fan 27 is mounted inside electrically conductive enclosure 11, and hastens the attainment of equivalent concentrations of radioactive gas atoms 25 in upper chamber 14 and in lower chamber 15 through forced movement of the air in electrically conductive enclosure 11. Although air mixing fan 27 is illustrated adjacent to first and second signal planes 12, 13, it could be placed anywhere within electrically conductive enclosure 11 that is convenient and that allows for effective air mixing.

When the electrostatic attraction of air ions 23 to first signal plane 12 is much greater than the air movement between lower chamber 15 and upper chamber 14, all of the air ions 23 will remain in lower chamber 15, while air ions 26 will be evenly distributed between lower chamber 15 and upper chamber 14.

Tests have indicated that air mixing fan 27 can introduce a electrical noise into the signals produced by electrometers 21, 22. To suppress this noise, shielding 27a can be placed around mixing fan 27.

Figure 3:
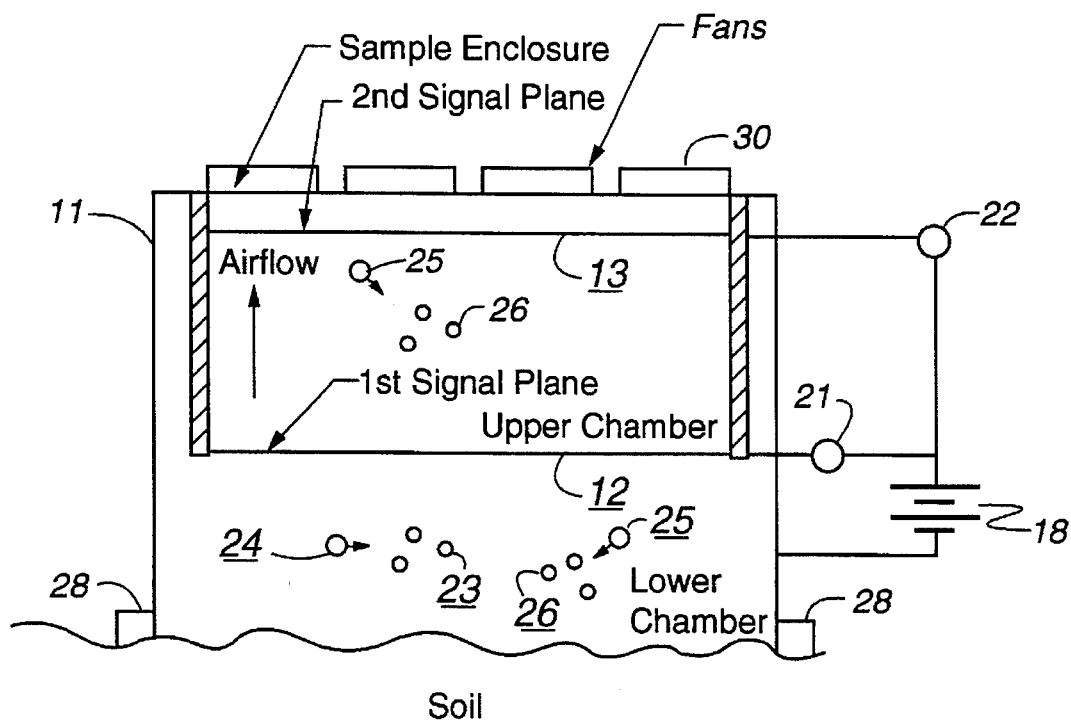
FIG. 3 is a schematical drawing of yet another embodiment of the present invention in which a plurality of fans are mounted to the top of the enclosure and the second signal plane is moved near the top.

A variation of the embodiment illustrated in FIG. 2 is shown in FIG. 3. Here, a plurality of fans 30 are mounted at the top of electrically conductive enclosure 11, and second signal plane 13 is moved higher within electrically conductive enclosure 11. Although four fans 30 are illustrated in FIG. 3, the actual number of fans 30 will depend on the design of electrically conductive enclosure 11, and on the testing application. Now, upper chamber 14 is defined as being between second signal plane 13 and first signal plane 12. Fans 30 will pull air and neutral radioactive gas atoms 25 through first signal plane 12, with any air ions 23 being collected by first signal plane 12, and into upper chamber 14, where ions 26 will be collected by second signal plane 13, and the air exhausted into the surrounding air.

Figure 4:
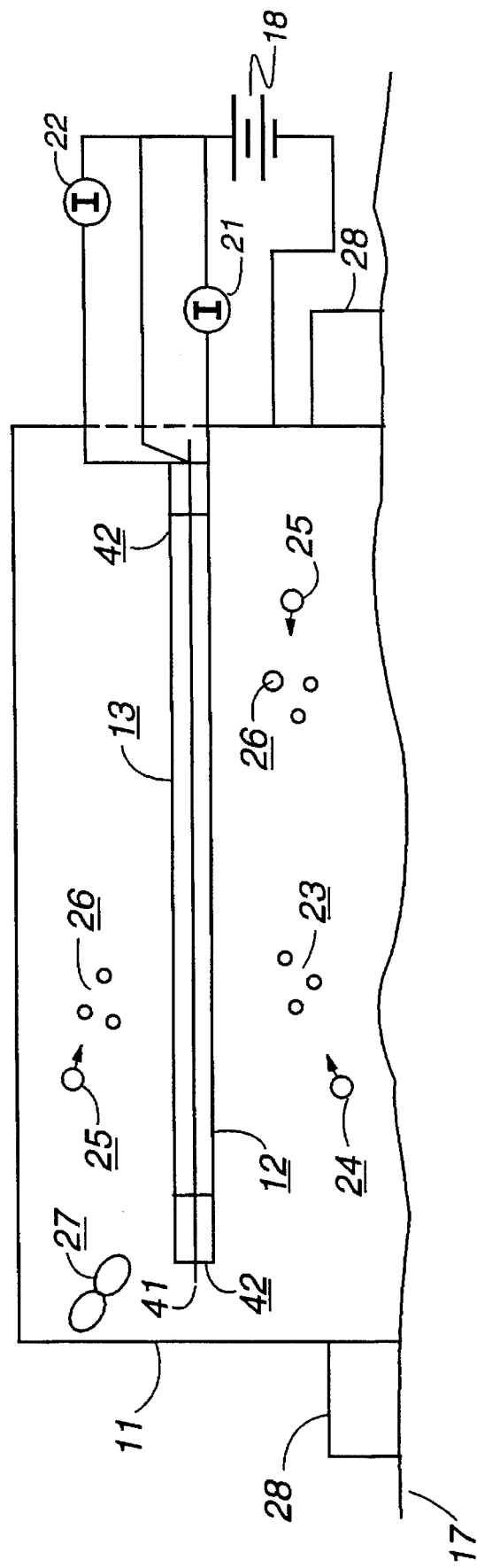
FIG. 4 is a schematical drawing of still another embodiment of the present invention in which guard plane is inserted between the signal planes.

Yet another embodiment of the invention is illustrated in FIG. 4 for applications where minimization of leakage currents is important. As shown, in this embodiment a guard plane 41 extends between first signal plane 12 and second signal plane 13, but is insulated from them by insulators 42. In this case, positive post 20 of voltage source 18 is connected to first signal plane 12, to second signal plane 13, and to guard plane 41. With first and second signal planes 12, 13 and guard plane 41 all at the same potential, any leakage current will flow primarily through guard plane 41 and through voltage source 18, and not through either electrometer 21 or electrometer 22. The assembly of first and second signal planes 12, 13 and guard plane 41 can be insulatively mounted to electrically conductive enclosure 11 through insulative stand-offs 16 as illustrated in FIG. 1, or can be mounted laterally with an insulative stand-off extending from guard plane 41 to the sides of electrically conductive enclosure 11.

As in previous embodiments, a fan 27 (FIG. 2) could be employed to circulate the air in electrically conductive enclosure 11 to establish equivalent concentrations of air ions 26 throughout electrically conductive enclosure 11.

Figure 5:
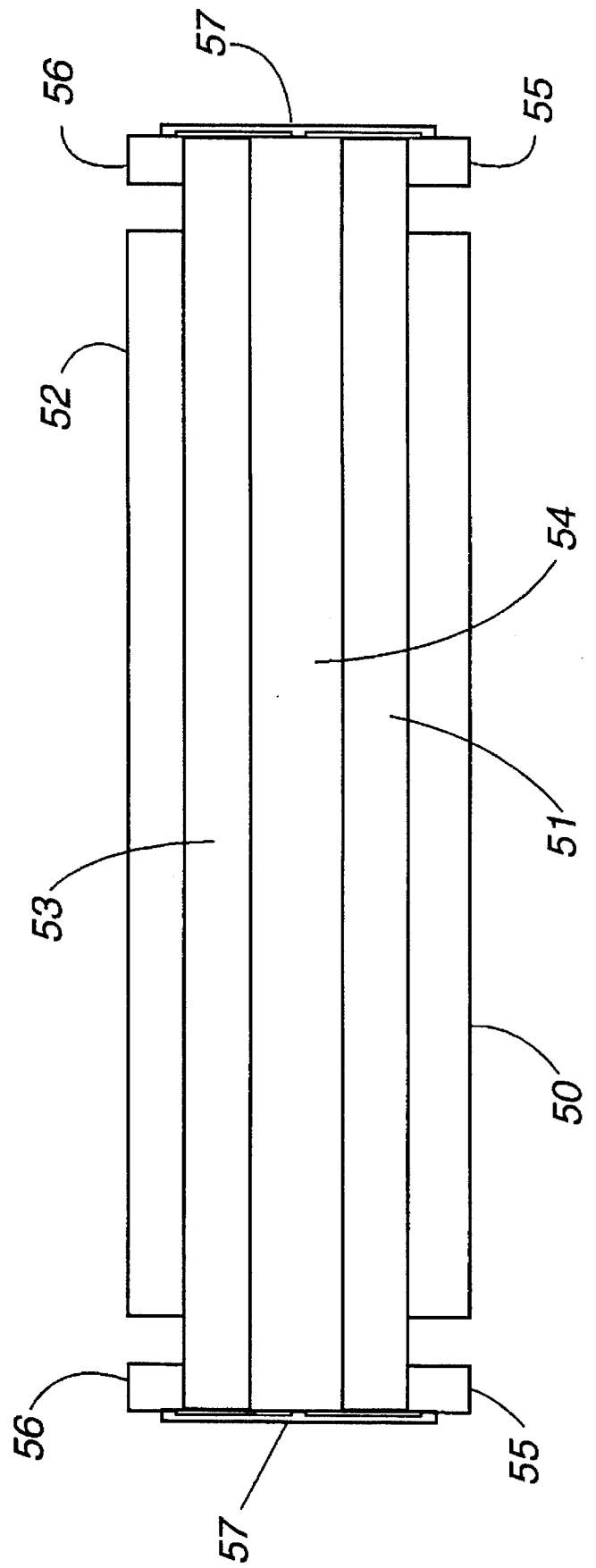
FIG. 5 is a cross-sectional view of another embodiment in which the first and second signal planes are mounted to insulative substrates and a guard plane is sandwiched between the substrates.

Still another embodiment of the present invention is illustrated in FIG. 5, wherein a cross-sectional view of only the signal plane section of the invention is shown. In this embodiment, first signal plane 50 is mounted to substrate 51, and second signal plane 52 is mounted to substrate 53. Sandwiched between first and second signal planes 50, 52 is guard plane 54. Guard ring 55 surrounds, but is spaced apart from first signal plane 50, and guard ring 56 surrounds, but is spaced apart from second signal plane 52.

Guard rings 55, 56 are electrically connected to guard plane 54 through straps 57, and prevent leakage, or crosstalk, between first signal plane 50 and second signal plane 52.

The entire assembly is mounted to electrically conductive enclosure 11 (FIG. 1), again by insulative stand-offs 16 (FIG. 1). As mentioned previously, insulative stand-offs 16 could extend laterally from guard plane 54 and attach to the sides of electrically conductive enclosure 11. In this embodiment, voltage source 18 (FIG. 1) would be connected to each of first signal plane 50, second signal plane 52, and to guard plane 54. Guard plane 54, and guard rings 55, 56, being at the same voltage as first and second signal planes 50, 52, reduces leakage currents between them and through electrometers 21, 22. There is a relatively large leakage current between guard plane 44 and electrically conductive enclosure 11, but this current does not flow through electrometers 21, 22, because of the direct connection of guard plane 44 to voltage source 18. As in previous embodiments, a fan 27 (FIG. 2) could be employed to circulate the air in electrically conductive enclosure 11 to establish equivalent concentrations of air ions 26 throughout electrically conductive enclosure 11.

An embodiment of the present invention was constructed in a 50 cm by 50 cm by 15 cm. aluminum sample enclosure with 1/32 in. solid aluminum plates used for first signal plane 12 and second signal plane 13. Insulative stand-offs 16 are comprised of LEXAN®, and establish a 1.0 in. spacing between first signal plane 12 and second signal plane 13. A 300 V. battery was used as voltage source 18, and a pair of Keithley 617 electrometers were used as electrometers 21, 22 to measure the currents produced in first signal plane 12 and second signal plane 13. This embodiment of the invention first was placed over a $^{239}$Pu pure alpha source. This produced a steady state reading of 180 fA from first signal plane 12, and a zero reading from second signal plane 13. This confirms that all air ions 23 from a non-radioactive emitting source are detected by first signal plane 12, and that none migrate to second signal plane 13.

In a further test, a piece of thorium ore, which produces both alpha radiation and radioactive gas, was placed below electrically conductive enclosure 11. The steady state readings obtained from electrometers 21, 22 indicated a reading of 38,000 fA from first signal plane 12, and a reading of 26,000 fA from second signal plane 13. Here, the reading from second signal plane 13 is directly proportional to only the gas contribution of the thorium source. However, the reading from first signal plane 12 is proportional to both the gas contribution and the alpha radiation. Subtracting the reading from second signal plane 13 from the reading from first signal plane 12 yields a signal proportional only to the alpha radiation from contaminated surface 17.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A background canceling long range alpha detector for measuring alpha radiation emitted from a surface comprising:

an electrically conductive enclosure defining a cavity, said enclosure having an opening at one end for positioning against a contaminated surface;

first signal plane means insulatively mounted in said cavity of said enclosure and spaced inwardly from said opening to define a first chamber within said cavity, said first chamber being between said first signal plane means and said opening, said first signal plane means being sized and positioned to substantially span said cavity so that air ions generated in said first chamber are electrostatically captured by said first signal plane means and said electrically conductive enclosure when an electric potential is applied between said enclosure and said first signal plane means, and said first signal plane means being configured to allow free circulation of air through said cavity and past said first signal plane means;

second signal plane means insulatively mounted in said cavity on the opposite side of said first signal plane means from said opening, to define a second chamber within said cavity, said second chamber being between said second signal plane means and said enclosure inward of said second signal plane means, said second signal plane means also being sized and positioned to substantially span said cavity so that air ions generated in said second chamber are electrostatically captured by said second signal plane means and said electrically conductive enclosure when an electrical potential is applied between said enclosure and said second signal plane means, and said second signal plane means also being configured to allow free circulation of air through said cavity and past said second signal plane means;

first indicator means attached to said first signal plane means for indicating a first electrical current produced by collection of air ions generated in said first chamber both by alpha particles emitted from said contaminated surface and by decay of radioactive gas emanated from said contaminated surface;

second indicator means attached to said second signal plane means for indicating a second electrical current produced by collection of air ions generated in said second chamber by decay of radioactive gas emanated from said contaminated surface; and a voltage source connected between said first and second indicator means and said electrically conductive enclosure;

whereby a difference between said first and second electrical currents represents a measure of said alpha particles emitted from said contaminated surface, free of any background signal produced by decaying radioactive gas emanated from said contaminated surface.

2. The background canceling long range alpha detector as described in claim 1, wherein said first signal plane means and said second signal plane means comprise solid sheets of aluminum.

3. The background canceling long range alpha detector as described in claim 1, wherein said first signal plane means and said second signal plane means comprise perforated sheets of electrically conductive material.

4. The background canceling long range alpha detector as described in claim 1, wherein said first signal plane means and said second signal plane means comprise planar electrically conductive grids.

5. The background canceling long range alpha detector as described in claim 1, wherein said first signal plane means and said second signal plane means are insulatively mounted inside said enclosure using polycarbonate resin stand-offs.

6. The background canceling long range alpha detector as described in claim 1, wherein said first signal plane means and said second signal plane means are insulatively mounted inside said enclosure using polytetrafluoroethylene standard-offs.

7. The background canceling long range alpha detector as described in claim 1, wherein said voltage source comprises a battery having a voltage of approximately 300 VDC.

8. The background canceling long range alpha detector as described in claim 1, wherein said voltage source comprises a source of approximately 300 VAC.

9. The background canceling long range alpha detector as described in claim 1, wherein said electrically conductive enclosure comprises aluminum.

10. The background canceling long range alpha detector as described in claim 1, wherein said first indicator means and said second indicator means comprise electrometers.

11. The background canceling long range alpha detector as described in claim 1 further comprising fan means for circulating air within said electrically conductive enclosure.

12. The background canceling long range alpha detector as described in claim 11, wherein said fan means comprises an electrically shielded fan mounted between said first signal plane means and said second signal plane means for equalizing airflow inside said electrically conductive enclosure.

13. The background canceling long range alpha detector as described in claim 1, further comprising air seal means disposed about said end of said electrically conductive enclosure defining said opening for sealing said cavity against the entry of foreign matter.

14. A background canceling long range alpha detector for measuring alpha radiation emitted from a surface comprising:

an electrically conductive enclosure defining a cavity, said electrically conductive enclosure having an opening at one end for positioning against a contaminated surface;

first signal plane means insulatively mounted in said cavity of said electrically conductive enclosure and spaced inward from said opening to define a first chamber within said cavity, said first chamber being between said first signal plane means and said opening, said first signal plane means being sized and positioned to substantially span said cavity so that air ions generated in said first chamber are electrostatically captured by said first signal plane means and said electrically conductive enclosure when an electric potential is applied between said enclosure and said first signal plane means, and said first signal plane means being configured to allow free circulation of air through said cavity and past said first signal plane means;

second signal plane means insulatively mounted in said cavity inward and spaced apart from said first signal plane means, to define a second chamber within said cavity, said second chamber being between said second signal plane means and said enclosure inward of said second signal plane means, said second signal plane means also being sized and positioned to substantially span said cavity so that air ions generated in said second chamber are electrostatically captured by said second signal plane means and said electrically conductive enclosure when an electrical potential is applied between said enclosure and said second signal plane means, and said second signal plane means also being configured to allow free circulation of air through said cavity and past said second signal plane means;

guard plane means insulatively mounted in said cavity between said first signal plane means and said second signal plane means for reducing leakage currents;

first indicator means attached to said first signal plane means for indicating a current produced by collection of air ions generated in said first chamber both by alpha particles emitted from said contaminated surface and by decay of radioactive gas atoms emanated from said contaminated surface;

second indicator means attached to said second signal plane for indicating a second electrical current generated in said second chamber by decay of said radioactive gas emanated from said contaminated surface;

a voltage source connected between said first and second indicator means and said guard plane means, and said electrically conductive enclosure;

whereby a difference between said first and second electrical currents represents a measure of said alpha particles emitted from said contaminated surface, free of background signal caused by decay of radioactive gas emanated from said contaminated surface.

15. The background canceling long range alpha detector as described in claim 14, wherein said first and second signal plane means are solid sheets of a conductive material mounted to an insulative substrate, and said guard plane means comprises a solid sheet of conductive material.

16. The background canceling long range alpha detector as described in claim 15, wherein said first and second signal plane means, said insulative substrate, and said guard plane means are perforated.

17. The background canceling long range alpha detector as described in claim 15, wherein said first and second signal plane means and said guard plane means are comprised of copper.

18. The background canceling long range alpha detector as described in claim 14, wherein said fan means comprises a single, electrically shielded fan mounted inside said electrically conductive enclosure for equalizing airflow inside said electrically conductive enclosure.

* * * * *